United States Patent [19]

Ladine et al.

[11] 3,745,312

[45] July 10, 1973

[54] PUNCHED TAPE READER, AND METHOD OF OPERATION

[75] Inventors: Duane A. Ladine, Northridge; Lester E. McCullough, Glendale, both of Calif.

[73] Assignee: Enviro-Labs, Inc., Glendale, Calif.

[22] Filed: May 24, 1971

[21] Appl. No.: 146,092

[52] U.S. Cl. .............................. 235/61.11 R, 226/79

[51] Int. Cl. ......................... G06k 7/015, G03b 1/24

[58] Field of Search .............. 235/61.11 R, 61.11 E, 235/61.11 C; 226/9, 79, 86; 178/17 A, 17 B; 250/219 R, 219 FT, 219 FR; 340/174.1 H

[56] References Cited

UNITED STATES PATENTS

| | | | |
|---|---|---|---|
| 3,350,546 | 10/1967 | Marjoram et al. | 235/61.11 C |
| 2,401,021 | 5/1946 | Rosenberg et al. | 235/61.11 E |
| 3,064,887 | 11/1962 | Waters et al. | 235/61.11 E |
| 3,051,381 | 8/1962 | Drillick | 235/61.11 C |
| 3,541,307 | 11/1970 | Dirks | 235/61.11 R |

*Primary Examiner*—Daryl W. Cook
*Attorney*—Beehler, Arant & Jagger

[57] ABSTRACT

A method of controlling and stopping a punched tape to be read, in which the leading edge of an alignment hole is sensed as indicating the arrival of an associated set of information holes. Then the tape is positively driven several small incremental distances forward, the increments being chosen such that each increment is a small fraction of the width of an information hole, and the several increments together are equal to less than the width of an information hole. Then the tape is stopped and the set of information holes is read. The tape reader apparatus for carrying out the method includes sensing means to detect arrival of the leading edge of an alignment hole, a stepper motor to drive the tape, a pulse source, and gating means for supplying a selected number of pulses to the motor after the arrival of the alignment hole has been detected.

4 Claims, 14 Drawing Figures

INVENTORS
DUANE A. LADINE
LESTER E. McCULLOUGH
BY
Beehler, Arant & Jagger
ATTORNEYS INVENTORS
DUANE A. LADINE
LESTER E. McCULLOUGH
BY
Beehler, Arant & Jagger
ATTORNEYS INVENTORS
DUANE A. LADINE
LESTER E. McCULLOUGH
BY
Beehler, Arant & Jagger
ATTORNEYS Patented July 10, 1973 3,745,312

5 Sheets-Sheet 4

INVENTORS
DUANE A. LADINE
LESTER E. McCULLOUGH
BY
Beehler, Arant & Jagger
ATTORNEYS INVENTORS
DUANE A. LADINE
LESTER E. Mc CULLOUGH
BY
Beehler, Arant & Jagger
ATTORNEYS

PUNCHED TAPE READER, AND METHOD OF OPERATION

BACKGROUND OF THE INVENTION

It has heretofore been conventional to utilize punched tape in which a plurality of information channels are contained, the information channels being arranged precisely parallel to each other and containing information holes at selected points along their length. More particularly, as the tape is being punched it is periodically advanced and stopped, and at each stopping point an information frame is punched into all of the information channels concurrently. For example, assuming there are ten information channels on the tape, a particular information frame may consist of no punched holes, or one or two or three holes, or even ten holes representing the largest number that could be carried by the information frame.

When the tape is to be read there are different techniques which may be used. In general, it is necessary to pass the tape over a row of viewing windows which are aligned transverse to the direction of tape movement. As a particular information frame passes over the viewing windows, the presence or absence of a punched hole will be sensed at each information channel of the tape. The tape may be advanced continuously and the holes read while the tape is moving, or the tape may be periodically stopped and the holes read only while the tape is stopped. It is well known to use either mechanical fingers for sensing the punched holes in the tape, or to pass light beams through the holes which are sensed by suitable photoelectric devices.

It has also been well known heretofore to place on the tape a drive hole channel, sometimes also known as an alignment hold channel or as a clock channel, although these terms are not identical in meaning. A drive hole channel may be placed on the tape before any information is punched into the tape, and may be used simply as a convenient mechanical means for driving the tape both during the punching of information into the tape and also during the subsequent reading of information from the tape. Information frames punched into the tape may, but are not necessarily required to be, transversely aligned with a particular hole of the drive hole channel. The term "clock channel," on the other hand, would imply that each hole location on the clock channel is precisely transversely aligned with the actual or possible location of an information frame. The term "alignment hole channel" would have a similar meaning.

One problem which has heretofore developed is at in utilizing a drive hole channel and/or clock channel for driving the tape while the information is being read from it, sometimes the drive holes are torn or enlarged. This results in various difficulties such as jamming the tape reading machine, and misalignment of the information holes of the information frame with the viewing windows of the reader.

SUMMARY OF THE INVENTION

According to one feature of the present invention a mechanical apparatus is provided for aligning and stopping a punched tape from which information is to be read, in which a clock channel on the tape is effectively utilized for both lateral and longitudinal alignment of the tape, but separate means are provided for advancing the tape so that damage to the holes of the clock channel is avoided.

According to another feature of the invention, a punched tape reader is provided with a stepping drive for advancing the tape in successive discrete steps which correspond to a small fraction of the width of information holes on the tape, whereby precise longitudinal alignment of the tape may be achieved prior to reading of the information.

According to another feature of the invention the longitudinal position in which the tape is to be stopped prior to being read is determined by first sensing the leading edge of a drive or alignment hole, and then driving the tape a selected number of small discrete steps so as to stop the tape at the approximate center of the associated information holes.

According to another feature of the invention a tape having a laterally spaced pair of drive hole channels is checked for possible skewed misalignment by observing the arrival at the reading station of the leading edges of a pair of the drive holes, one for each channel, and when the leading edge of the second drive hole of the pair has arrived and the presence of the first drive hole is still being observed, then advancing the tape by an additional distance so as to stop at a desired alignment position, so as to stop the tape near the approximate centers of both of the drive holes.

Thus the primary object of the present invention is to provide a method and apparatus for reading punched tape, which is precise and reliable in operation and avoids undue wear on the tape being read.

Other and more specific objects of the invention, and other and more specific novel features and advantages thereof, will become apparent from the following detailed description.

DRAWING SUMMARY

PREFERRED EMBODIMENT

Reference is now made to the drawings, FIGS. 1 to 14, inclusive, illustrating the single presently preferred embodiment of the invention.

Figure 10:
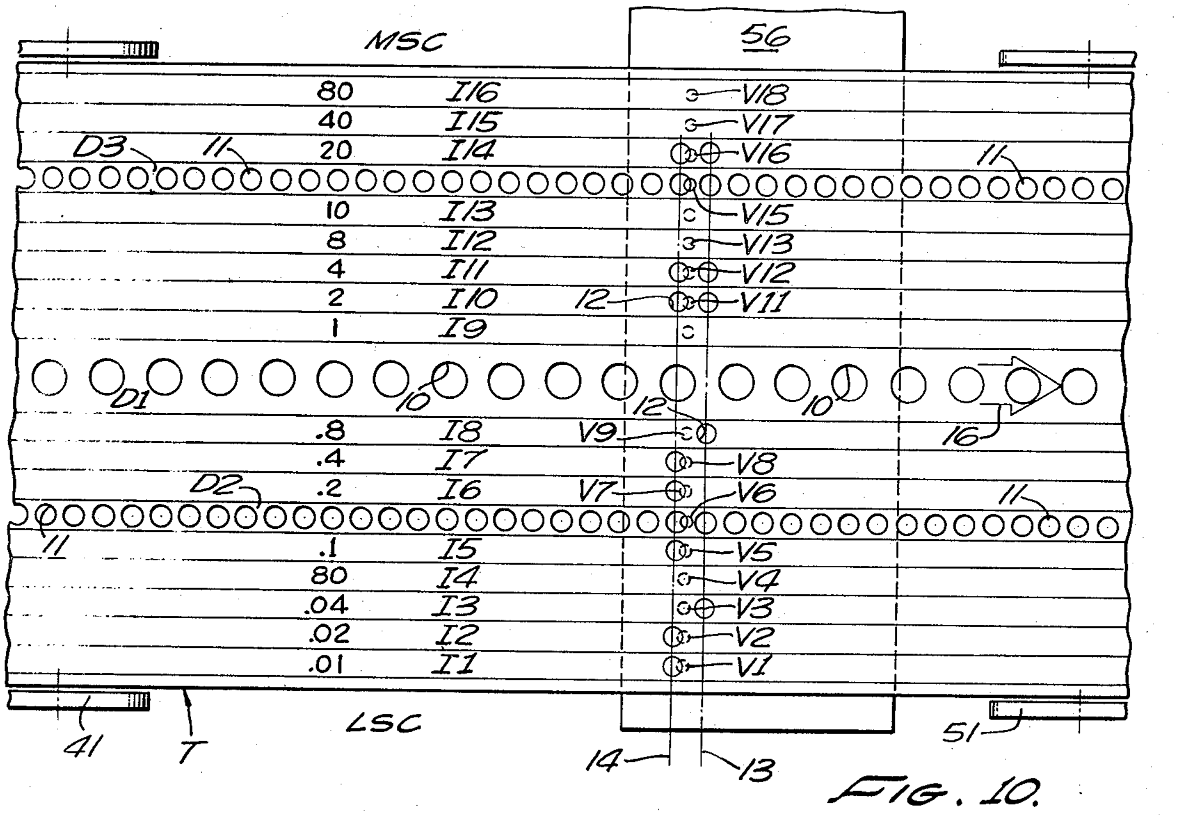
FIG. 10 is an enlarged top plan view of the tape as it passes through the reading station.

Attention is first directed to FIG. 10 which illustrates in specific detail a particular type of punched tape T for which the machine herein illustrated has been designed. The tape T as presently utilized is a paper tape having a width of approximately 2⅛ inches, and accommodates a total of 19 longitudinal channels of which 16 are used for punched holes representing successive information frames. In the lateral center of the tape is a sprocket channel D1 having a succession of sprocket holes 10. An arrow 16 represents the direction of tape movement. Commencing on the right hand side of the tape relative to arrow 16 (the lower side as shown in FIG. 10) the information channels are numbered I1, I2, I3, I4, and I5. The next channel has the same available width on the tape as an information channel, but is designated as drive channel D2 having successive drive holes 11. Then there follow information channels I6, I7, and I8, after which is the sprocket channel D1 previously identified.

The left hand side of the tape (the upper part as shown in FIG. 10) is essentially a duplication of the right hand side. The channel immediately next to sprocket channel D1 is information channel I9, and then following information channels I10, I11, I12, and I13. The next channel is drive channel D3 having drive holes 11. Then follow information channels I14, I15 and I16.

In FIG. 10 it is seen that the tape T passes over a sensor housing 56, and a row of 18 viewing windows V are contained in the sensor housing. Viewing windows V are shown in dotted lines; the row of viewing windows is arranged precisely perpendicular to the direction of tape movement; and it will also be observed that the width of each viewing window V is significantly less than the width of each drive hole 11 of the drive channels D2, D3. For more convenient reference the various viewing windows V are designated as V1 to V5, respectively, for the information channels I1 to I5; V6 for the drive channel D2; V7 to V14 for the information channels I6 to I13, respectively; V15 for drive channel D3; and V16 to V18 for information channels I14 to I16, respectively.

In the particular manner in which the illustrated tape T is generally used, information channel I1 represents the least significant character while information channel I16 represents the most significant character. The 16 channels are utilized to represent four decimal digits of information, with each sub-group of four channels representing a single decimal digit. For purpose of illustration in FIG. 10 the tape T is shown as being punched with only two frames of information, including one frame representing the number 2,684 which has just passed the reading station and another frame representing the number 2,673 which is just now entering the reading station. When the tape T moves a little further, stops, and is read, the number 2,673 will then appear on the visual display or monitor 25, as shown in FIG. 1.

Attention is now directed to FIGS. 1 to 9, inclusive, illustrating the mechanical portion of the tape reader machine of the present inventIon.

Figures 1, 2:
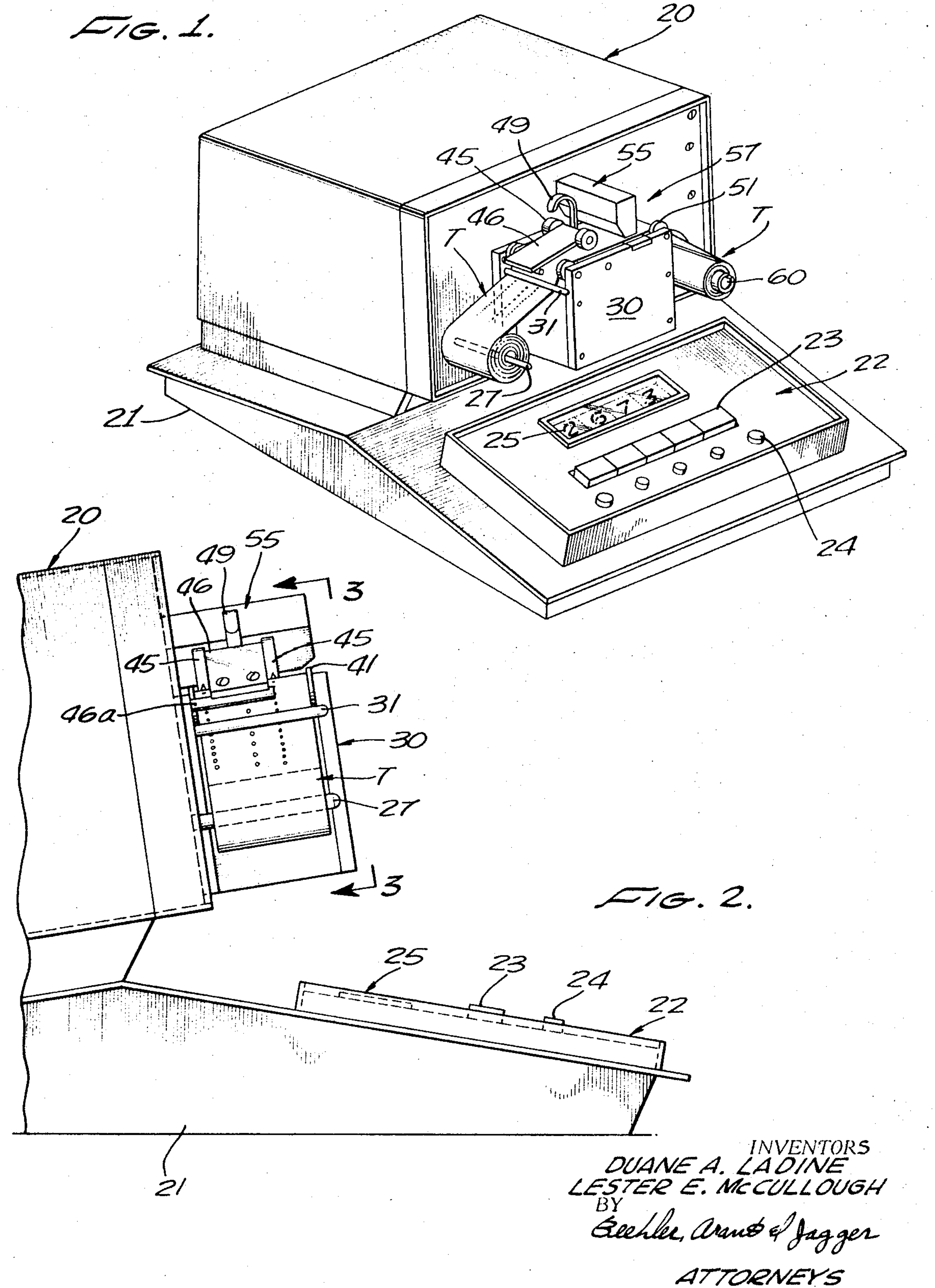
FIG. 1 is a perspective view of the tape reader of the present invention.
FIG. 2 is a side elevational view of the front portion of the machine.

A relatively large main housing 20 is supported on the rearward portion of a base 21, and on the front portion of base 21 (as seen in FIG. 1) there is a relatively small control console 22. Located on the console are a row of five control buttons 23, each having a specifically different function for controlling some particular phase of operation of the machine. An indicator light 24 is associated with each control button 23. Above the row of control buttons 23 the console also carries a visual display unit or monitor 25, which provides a visual display of the decimal number that is currently being read by the machine. The machine is capable of operating at a maximum reading speed of about 50 frames per second, and at that maximum the visual display unit 25 is difficult to read, but the visual display is nonetheless very useful at lower reading speeds or when the tape is stopped.

A relatively small reader housing 30 is supported from the forward wall of main housing 20, and partially contains a reading station through which the tape T passes. The tape is initially in a form of a large roll which is simply slipped over a peg or post 27, extending outward from the front wall of housing 20, which therefore performs the function of a payout reel. The tape is then threaded underneath a guide pin 31 and over a first idler roller 40, the roller or drum 40 being rotatably supported from one upper corner of the reader housing 30. The tape is then threaded over a friction drive roll 70 (FIG. 9) and being engaged on its upper surface by a pair of spring loaded, stainless steel rollers 45. The tape is then passed through a reading station 57 which includes a light box 55 suspended above the tape, one end of the light box being rigidly attached to the forward wall of main housing 20. Reading station 57 also includes a sensor housing 56 which is contained within the upper portion of reader housing 30, and over which the tape passes. The tape then passes over a second idler roller 50, rotatably supported at the other upper corner of housing 30. It then extends underneath a guide pin 32 protruding from the forward wall of housing 20, and around a takeup reel 60. Takeup reel 60 has an associated drive means which provides a predetermined amount of forward drive torque, thus maintaining a predetermined level of tension in the tape. The forward drive for the tape is produced by friction drive roll 70, against which the tape is pressed by the rollers 45.

The idler roller 40 has end flanges 41 and the distance between end flanges is only slightly greater than the width of tape T, thus ensuring a reasonably accurate lateral positioning of the tape as it passes over the roller 40. Roller 40 also has a pair of circumferential rings of sprocket teeth 42 rigidly affixed to the roller, which are spaced apart by the same distance as the drive channels D2, D3 of the tape, and are positioned to most advantageously engage the drive channels when the tape is centrally positioned on the idler roller. Idler roller 50 is similarly constructed, having end flanges 51 and rings of sprocket teeth 52 for engaging the holes of the drive hole channels.

Figure 4:
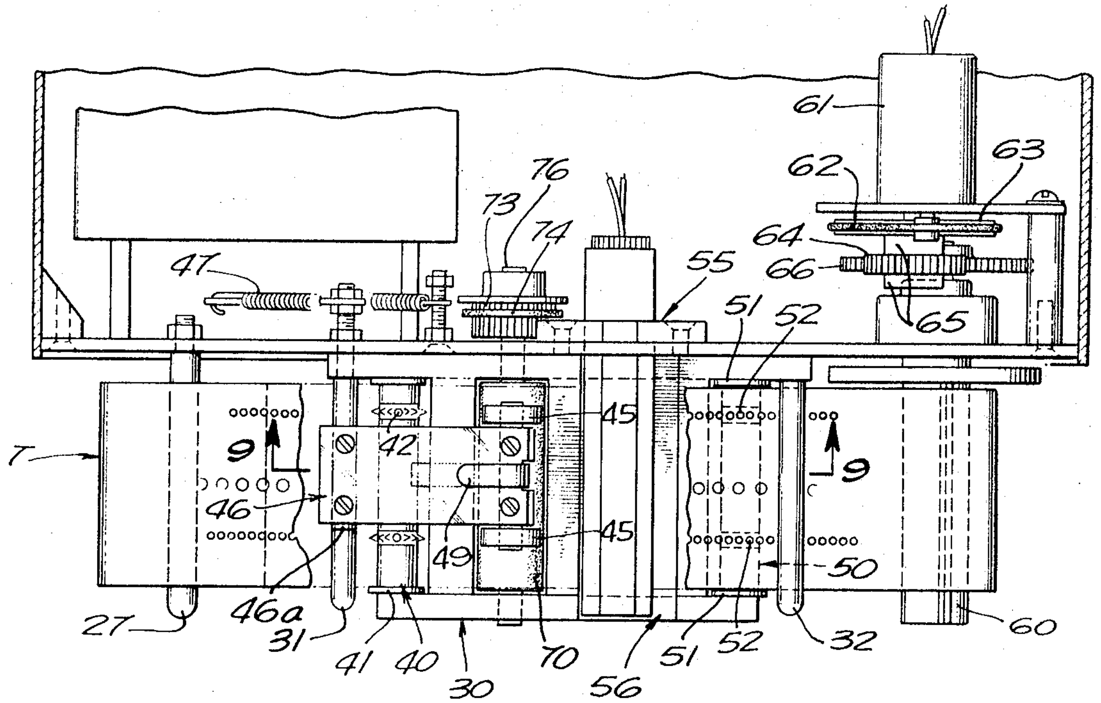
FIG. 4 is a top plan view of the interior portion of the machine taken on the line 4—4 of FIG. 3.

The rollers 45 are rotatably supported from one end of a pivotal member 46, the other end of member 46 being attached to a shaft 46*a* which protrudes through the forward wall of housing 20. The shaft 46*a* is rotatable in the wall of the housing, and the other end of the shaft inside the housing is subjected to a twisting force or torque from a spring 47. Thus the spring 47 maintains a certain amount of downward pressure of the rollers 45 upon the tape T. As best seen in FIG. 4, rollers 45 are laterally spaced by the same amount and at the same locations as sprocket teeth 42, 52 of the idler rollers, with the result that tape T is grasped between rollers 45 and friction drive roll 70 at the locations of the two drive channels D2, D3.

Figures 5, 6, 9:
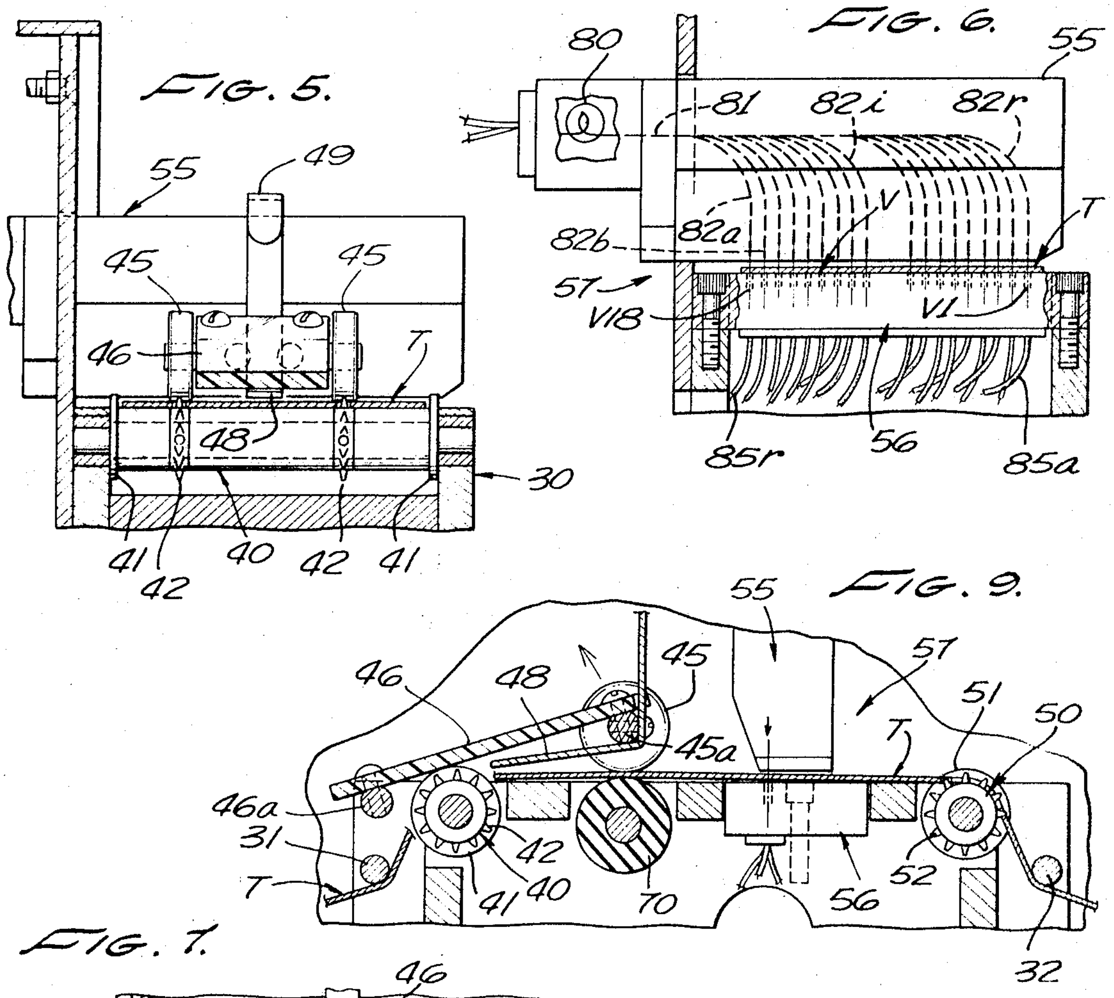
FIG. 5 is a fragmentary cross-sectional view taken on the line 5—5 of FIG. 3.
FIG. 6 is a fragmentary cross-sectional view of the reading station, taken on line 6—6 of FIG. 3.
FIG. 9 is a cross-sectional view of the tape drive and alignment mechanism, taken on line 9—9 of FIG. 4.

A backup guide 48 is also attached to the shaft 45*a* whose ends carry the rollers (see FIG. 9). The backup guide is a flat plate which is spaced some distance above tape T at the location of rollers 45, extends back toward the idler roller 40 and is significantly closer to the tape where it terminates adjacent the idler roller 40. The purpose of backup guide 48 is to prevent the tape from bulging upwardly when being driven in the reverse direction. The need for backup guide 48 arises from the fact that during reverse drive of the tape there is no provision for providing a pulling force of tension on the tape from the payout reel (post 27). The same plate which provides backup guide 48 also extends underneath and around the shaft 45*a* (to which it is fastened with a pair of screws) and then extends upward from the rollers 45 and is bent over to provide a lifting handle 49 (FIGS. 3 and 5).

Figure 3:
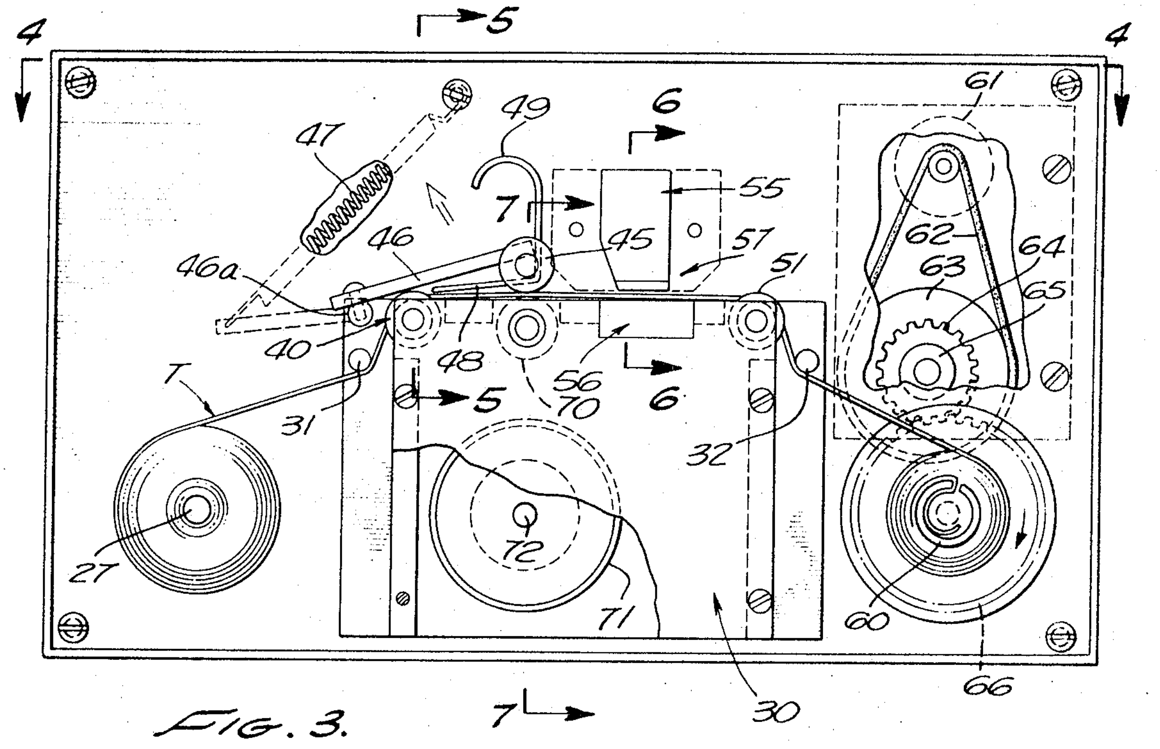
FIG. 3 is an elevational view, with some parts cut away, of the tape reader portion of the machine, taken on line 3—3 of FIG. 2.

The drive mechanism for takeup reel 60 is shown in FIGS. 3 and 4. A standard D. C. motor 61 is positioned within the main housing 20. A small pulley wheel mounted on the motor shaft drives a belt 62 which in turn drives a larger pulley wheel 63, independently supported in the housing. A pair of friction clutch plates 65 are supported on the same shaft with pulley wheel 63 and rotate with that pulley wheel. A gear wheel 64 is grasped between the friction clutch plates 65, and is rotatably driven by the clutch plates, up to a predetermined amount of torque. Gear wheel 64 directly engages gear wheel 66 which is rigidly attached to the shaft of takeup reel 60. Motor 61 runs continuously, and the clutch plates 65 serve to impart sufficient torque to gear wheel 64 so as to maintain the tape in a relatively tight condition, and thus prevent twisting or misalignment of the tape.

The arrangement of reading station 57 is best shown in FIG. 6. A light source 80 is contained within main housing 20 and provides light to a fiber optic bundle or cable 81. Cable 81 extends into the light box 55, and has various branches 82*a*, 82*b*, etc. The cable 81 and its branches 82 are shown in dotted lines. Each of the branches 82 terminates directly above a corresponding one of the viewing windows V. The viewing windows V are also indicated in FIG. 6 by means of dotted lineS. Each of the viewing windows V1 to V18, inclusive, contains a phototransistor, not specifically shown. Each phototransistor in turn provides an input signal for a Schmidt trigger circuit, also not specifically shown. The output for each of the viewing windows is carried on a corresponding cable 85*a* . . . 85*r*.

Figure 7:
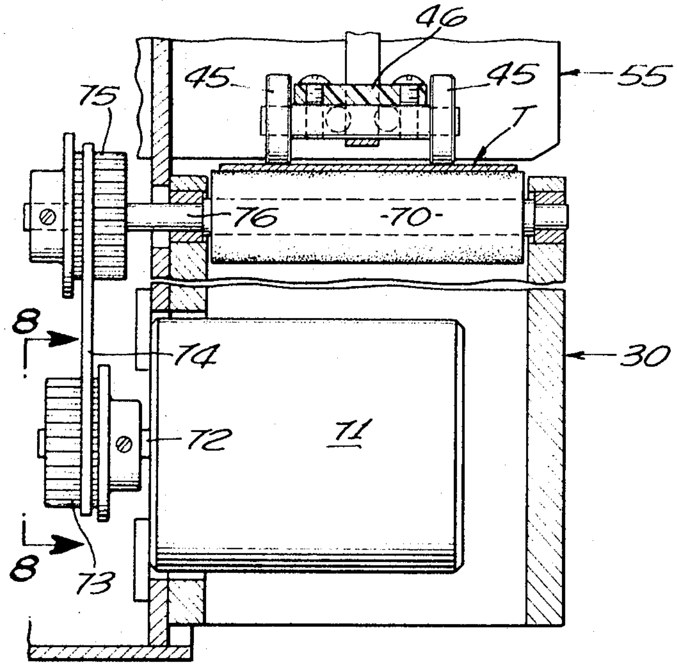
FIG. 7 is a fragmentary cross-sectional view taken on the line 7—7 of FIG. 3.
Figure 8:
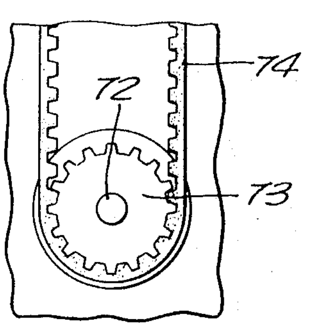
FIG. 8 is a fragmentary view taken on the line 8—8 of FIG. 7.

The driving mechanism for friction drive roll 70 is best shown in FIGS. 4, 7 and 8. A stepper motor 71 is contained within the lower part of reader housing 30. Stepper motor 71 has a motor shaft 72 to which a drive gear or sprocket 73 is attached. Located above the drive gear or sprocket 73 is a similar drive gear or sprocket 75, carried on the end of shaft 76 which is the supporting shaft for friction drive roll 70. A toothed belt 74 is received by both of the drive sprockets 73, 75, to complete the drive train. The drive sprockets 73, 75 preferably have molded polyurethane gear wheels. The toothed belt 74 is preferably made of polyurethane with dacron fibers. Friction drive roll 70 is preferably a hard rubber roller manufactured to precision specifications.

Motor 71 is energized by a succession of discrete energy pulses. The characteristics of the motor and of the pulse source are so selected that the application of each pulse causes the motor to rotate through an angle of approximately 1.8°. Although the associated electrical circuit provides means for adjusting the rate at which driving pulses are generated, the maximum available pulse rate is approximately 500 pulses per second which leaves a sufficient space between pulses so that the motor 71 comes to a complete stop after the application of each pulse and prior to the application of the next succeeding pulse. Therefore, within a period of 2 milliseconds the motor starts, travels through the desired 1.8° of rotation, and then comes to a complete stop.

In the tape T the width of each drive hole 11 is nominally 0.06 inch. The spacing between adjacent drive holes is nominally 0.04 inch. The nominal spacing between centers of adjacent drive holes is nominally 0.10 inch. The width of each viewing window V is significantly less than the width of a drive hole 11, being typically about half that width or 0.04 inch. The diameter of friction drive roll 70 is so selected that 10 energy pulses must be supplied to the motor 71, rotating the motor and its drive sprocket through an angle of 18°, in order to move the surface of friction drive roll by the distance between centers of two adjacent drive holes 11, i. e., a distance of 0.10 inch. In order to provide that result the diameter of friction drive roll 70 is approximately 0.56512 inch.

It therefore follows that the application of each energy pulse to the motor 71 results in advancing the surface of friction drive roll 70 by one-one hundredth inch. Thus within 2 milliseconds an energy pulse is applied to the motor, the motor starts, the motor runs, and the motor comes to a stop, having rotated through an angle of 1.8 degrees. At the end of the energy pulse the stopping time for the motor is approximately one-fourth millisecond, representing a travel distance at the surface of friction drive roll 70 of approximately three-one thousandths inch. Thus the drive roll surface travels approximately seven-one thousandths inch while the energy pulse is being applied to the motor, and the remaining three-one thousandths inch after the pulse has ended.

The manner in which information holes are cut in the tape T is of considerable significance. When the blank tape is manufactured the sprocket holes 10 of sprocket channel D1 are cut into it. The blank tape is loaded into a machine which is capable of accepting binary information and perforating or punching the tape so as to represent that information. Sprocket holes 10 are utilized to drive the tape when the information is being punched or recorded onto the tape. However, each successive one of the information frames is not necessarily aligned in any particular relationship to a sprocket hole 10. The drive holes 11 of drive channels D2 and D3 are punched into the tape at the same time as the information is punched into it. The actual practice is to utilize a single cutting head having 18 separate punching mechanisms, and the two punching mechanisms associated with drive channels D2 and D3 are operated continuously and punch holes at the location of each information frame. At each information frame location the number of the other punching mechanisms which will operate for punching a hole, is entirely a function of the information content of that particular information frame. In some instances the information might be zero and no holes would be punched, and in other instances all 16 holes might be punched. But for whatever number of information holes are punched, there is a rather precise alignment with the associated pair of drive holes 11 because all of the punching mechanism are contained in a single rigid structure and are precisely aligned. Thus it follows that when the tape is being read the drive holes 11 may be utilized to provide a reliable alignment of the information holes for each information frame, while sprocket holes 10 would not provide an equally accurate source of alignment information.

It will be noted that when the tape is first loaded into the machine the lead portion of the tape does not contain punched information holes. It therefore does not contain the drive holes 11 either. It is necessary to thread the tape through the machine, provide the necessary tension for the takeup reel 60, and then advance the tape to the start of information by using the manual advance switch, which will be subsequently explained in conjunction with the electrical control circuit of FIG. 13. From a mechanical point of view, however, the tape must initially pass over sprocket teeth 42 of idler roller 40 and sprocket teeth 52 of idler roller 50 even though there are no drive holes 11 in the tape. It is therefore necessary for the operator to avoid pushing the tape down by hand on these idler rollers, as that would create false holes in the drive channels D2, D3, which are not desired. The use of the manual advance switch will cause the tape to advance the first information frame to the reading station 57 and when that occurs the drive holes 11 have already become engaged by sprocket teeth 42 of idler roller 40. Subsequent further advances of the tape will cause the drive holes 11 to reach the idler roller 50 where they will become engaged by sprocket teeth 52. After that point of operation is reached the machanical alignment of the tape is somewhat more stable than it was initially.

ELECTRICAL OPERATION

Reference is now made to FIGS. 10 to 14, inclusive, for purpose of describing the electrical operation of the tape reader machine.

Figures 11, 12:
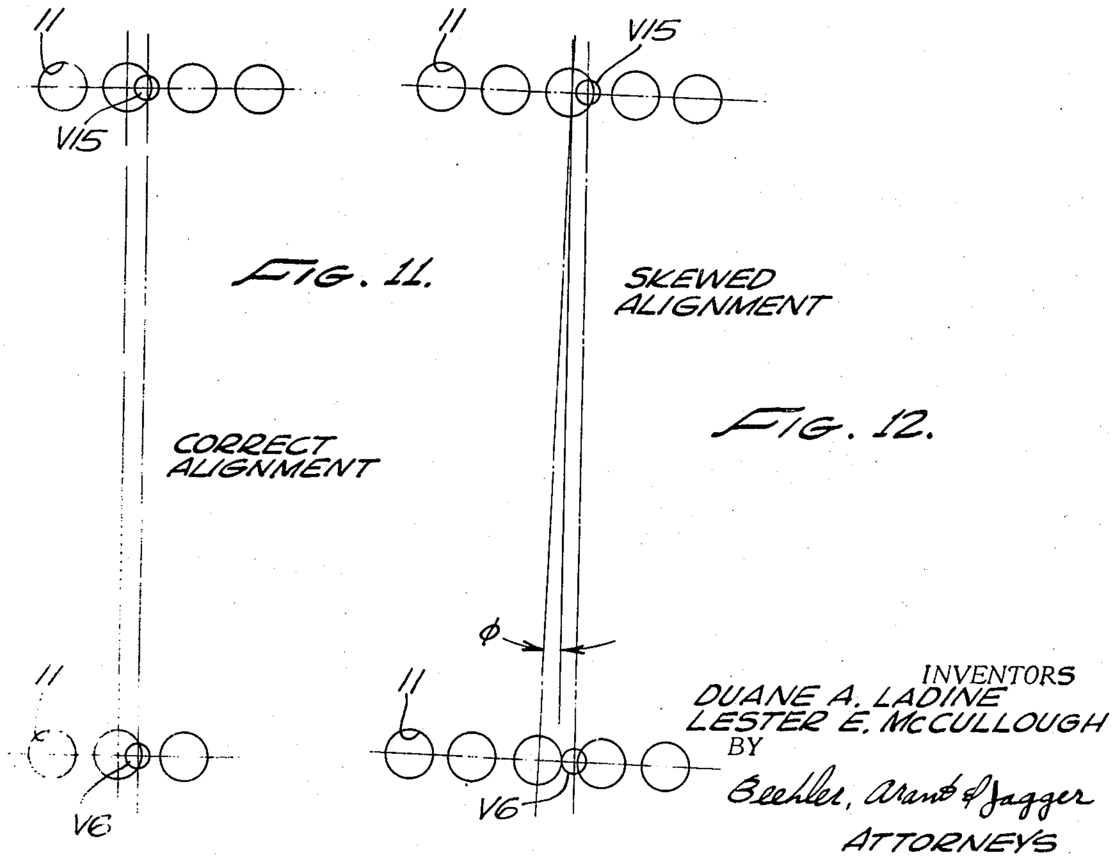
FIG. 11 is a schematic view illustrating a precisely correct tape alignment.
FIG. 12 is a schematic view like FIG. 11, but illustrating a slightly skewed misalignment of the tape.

FIG. 11 illustrates a condition in which the alignment of the tape is entirely correct. The leading edge of a drive hole 11 of drive channel D2 is sensed through viewing window V6 at exactly the same time as the leading edge of corresponding drive hole 11 of channel D3 is sensed through viewing window V15.

FIG. 12 represents a condition in which the tape is slightly misaligned because of being skewed relative to its longitudinal center. It is shown in FIG. 12 that the leading edge of the hole 11 of channel D3 is being sensed through the viewing window V15 of the reading station, while the corresponding drive hole 11 of channel D2 has not yet arrived at a position to be sensed by the corresponding viewing window V6. The reason for this difference is that a small angle $\phi$ exists between the transverse axis of the tape and the common axis of the viewing windows.

According to the present invention a means for longitudinal alignment of the tape is provided, so that the leading edge of a drive hole 11 is first detected and then the tape is driven a selected further distance in order to stop the tape so that the approximate center of the drive hole will be located above its associated viewing window.

According to a more specific feature of the invention the leading edges of the corresponding drive holes of both drive channels D2 and D3 are sensed concurrently, so that the longitudinal position at which the tape is stopped is determined in part as a function of any skewing that may exist in the tape.

Figure 13:
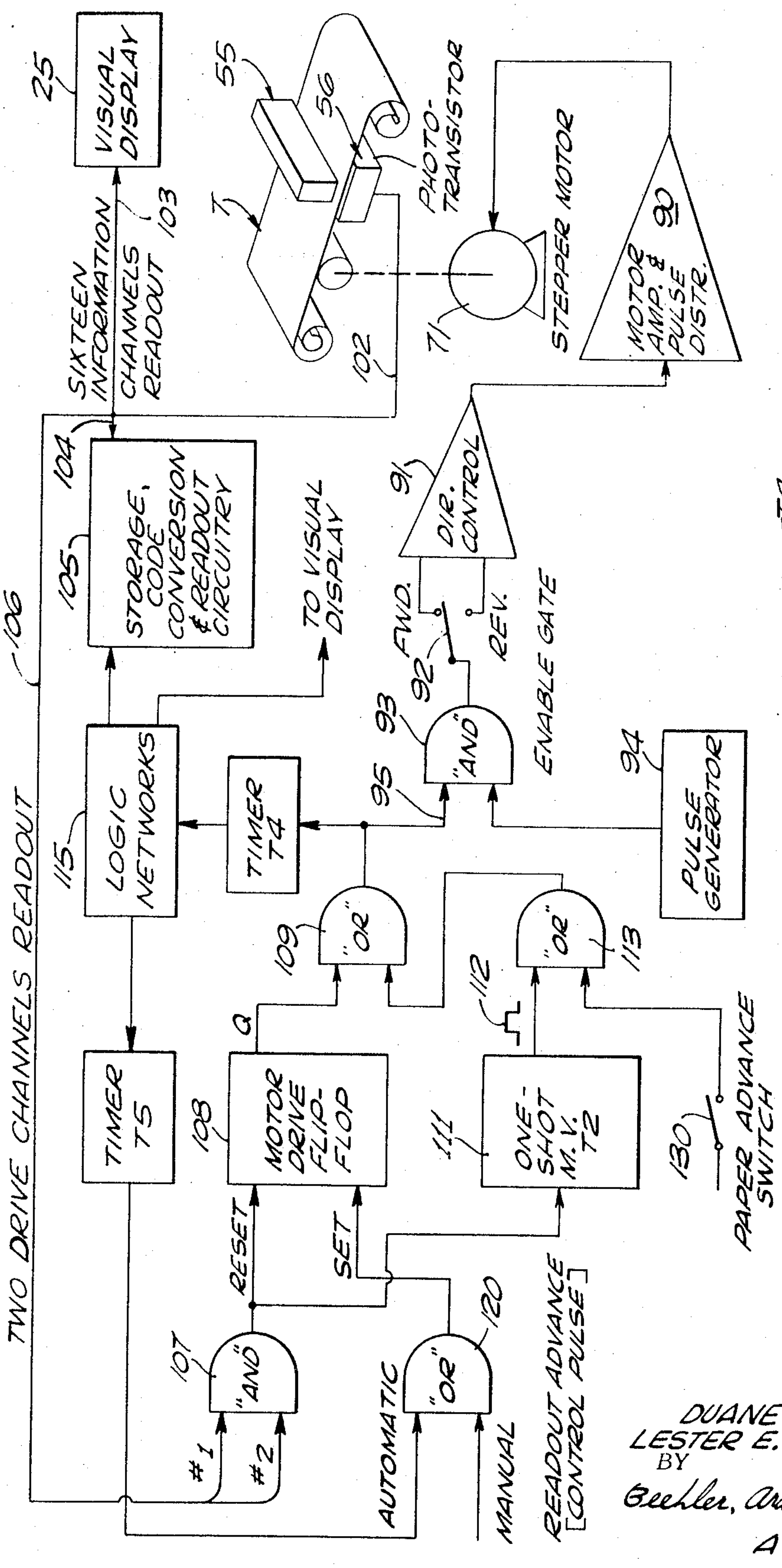
FIG. 13 is a schematic diagram of the electrical circuit controlling the tape drive and tape reading operations.

Reference is now made to FIG. 13 which schematically illustrates the electrical control circuit of the tape reader machine insofar as the alignment and stopping of the tape, and control of the reading operation, are concerned. Stepper motor 71 is driven by a pulse amplifier and distributor circuit 90. The circuit 90 developes a series of square-wave pulses of predetermined amplitude and time duration and supplies them to the motor. Stepper motor 71 may, for example, be a four-phase motor, with distributor circuit 90 supplying pulses to the various windings in a particular sequence. The pulse amplifier and distributor circuit 90 receives its input signals from a direction control circuit 91, and a reversing switch 92 is coupled to the direction control circuit 91 and has a forward position and a reverse position of which one is selected to determine the direction of rotation of the stepper motor 71. An enable gate 93 supplies a signal through the switch 92 to the direction control circuit 91. The enable gate 93 is an "and" circuit which provides an output signal only when signals are received at both of its inputs. A pulse generator 94 is a clock pulse circuit which runs continuously, and is coupled to the gate 93 to provide one of the inputs thereto. The other input to gate 93 is designated as 95, and whenever that input receives a signal the pulse or pulses then being generated by the generator 94 will pass to the pulse amplifier and distributor circuit 90, causing the motor to run. Thus effectively the driving pulses for the motor are generated by generator 94, while circuit 90 merely amplifies and shapes each pulse and delivers it to a particular motor winding.

Figure 14:
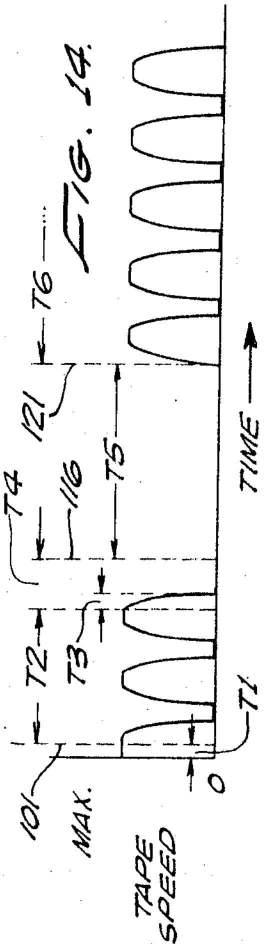
FIG. 14 is a time diagram illustrating the stopping of the tape for purpose of reading an information frame.

The time intervals involved in reading one information frame are shown in FIG. 14. At 0 time as indicated in FIG. 14 the tape is approaching the reading station, and the leading edge of one drive hole 11 has been detected. Due to a slight skewing of the tape, there is a small time delay before the arrival of the drive hole 11 of the other channel is detected. After a time delay T1 the leading edge of the second drive hole 11 has arrived over its corresponding viewing window, and dotted line 101 indicates the condition where both of the drive holes are concurrently sensed by their respective viewing windows. A signal will now be generated to tell the motor to stop, not immediately, but after a certain additional period of time.

A cable 102 represents the outputs of the viewing windows V, i.e., their respectively associated phototransistors and Schmidt trigger circuits. The readout from 16 information channels passes along a cable 103 to the visual display unit 25, and also along a cable 104 to a storage, code conversion and readout circuit 105. At the same time the output signals from the viewing windows V5 and V16 (representing drive channels D2 And D3) pass along a cable 106 to a logic circuit 107. The logic circuit 107 is an "and" circuit and will provide an output signal only when both of its input signals are present. The concurrent detection of the leading edges of a pair of the drive holes 11 will cause the logic circuit 107 to become operative and provide an output signal.

A motor drive flip-flop 108 is of the set-reset type. The flip-flop is normally "on" so that its primary or Q output provides a steady state signal at a high voltage or binary "one" level. The output of flip-flop 108 provides one of the inputs for a logic circuit 109, which is a "or" circuit. The output of logic circuit 109 is in turn connected to the input terminal 95 of logic circuit 93. When the flip-flop 108 is "on" the enable gate 93 is operative, and pulses from the clock pulse generator 94 are delivered to the motor amplifier and pulse distributor 90.

The output signal of logic circuit 107 is also coupled to the single input terminal of a multi-vibrator circuit 111. Circuit 111 is a multi-vibrator of the one-shot type, and is designed to produce a window 112 whose duration corresponds to approximately two of the motor drive pulses. The one-shot multi-vibrator 111 is also known as the T2 circuit, corresponding to time interval T2 as shown on the time diagram of FIG. 14. An output signal from "and" circuit 107 is applied to the reset input of the motor drive flip-flop 108, turning it off, and at the very same time is applied to the input of circuit T2 turning it on. The output of T2 is coupled to an "OR" gate 113 as one of its inputs and the output of "OR" gate 113 is coupled to "OR" gate 109 as its second input. When the window 112 is produced by the T2 circuit, therefore, it passes through both of the "OR" gates 113 and 109 and also through the "and" circuit 93 and hence is effective to continue the application of drive pulses to the motor.

Thus the detection of the leading edges of a pair of the drive holes 11, signified as occurring at the dotted line 101 of FIG. 14, causes the application of motor drive pulse to stop, but only after the time delay T2. Time interval T3 of FIG. 14 represents the stopping time required by the motor, because of its inertia, after the last energy pulse has been applied to it. When the motor has stopped at the end of time inteval T3, the tape has also stopped, and an information frame is ready to be read from the tape.

However, to be certain that the motor has stopped, a timer T4 is included in the circuit. The output signal of "OR" gate 109 is applied to timer T4 as well as to the input terminal 95 of gate 93. Timer T4 times a delay interval which may, for example, be one millisecond. At the end of that time interval a signal is provided to logic networks 115, which concurrently provide signals to the visual display unit 25 and also to the storage and code conversion circuit 105 and a timer T5. In FIG. 14 a dotted line 116 represents the end of time interval T4 and the time at which reading of the information frame actually commences.

The purpose of timer T5 is to allow some operating time for the reading circuits to do their work. The time interval T5 may, for example, be three milliseconds. After that time interval has been counted the timer T5 then provides a signal to one input terminal of "OR" gate 120. The "OR" gate 120 is the readout advance circuit. Its output terminal is coupled to the "set" input of motor drive flip-flop 108. When a signal is received from timer T5, advance circuit 120 provides an output signal which returns the flip-flop to its "on" condition. This occurrence is indicated by dotted line 121 in the timing diagram of FIG. 14. At that point of time the flip-flop enables pulses from the clock generator 94 to reach the motor.

Flip-flop 108 also has a self-locking circuit, not specifically shown, associated with its "set" input. When the "set" input is pulsed by the "OR" gate 120, the flip-flop is turned "on" and at the same time the self-locking circuit is activated. The self-locking circuit has a timing cycle which times an interval corresponding to three or four of the clock pulses, and at the end of that timing interval it is deactivated. Thus when the flip-flop is first turned "on" the timer T4 provides a brief time interval before the logic networks are enabled; then at that time the "and" circuit 107 will again produce an output signal because the drive holes 11 are still positioned over their respective viewing windows. However, the output signal from "and" circuit 107 is not effective to reset the flip-flop, because of the self-locking circuit described above. The tape will therefore continue to advance for a distance corresponding to approximately eight driving pulses, until another sensing condition 101 is reached, indicating that the next succeeding pair of drive holes 11 have arrived at the reading station.

Among the control buttons 23 are a "auto-manual" switch and a "step" switch. The "auto-manual" switch selects either the automatic or the manual input for readout advance circuit 120. When the Automatic input is selected, the circuit is as shown in FIG. 13. When the Manual input is selected, the automatic control is disconnected.

When the tape is first threaded into the machine the "auto-manual" switch is placed in the "manual" position. Then the "step" switch is depressed, which has the effect of applying a pulse to the Manual input of the readout advance circuit 120. The motor then starts to run, and advances the tape until the first pair of drive holes 11 arrive at the reading station. At that time the operation of "and" circuit 107 is effective to reset the flip-flop and stop the tape.

Also included in the circuit is a paper advance switch 130, which is connected to the other input of "OR" gate 113. When switch 130 is closed, a steady-state voltage level of the high or "binary 1" level passes through the gates 113, 109, and 93, and thereby enables the pulse generator output to be applied to the distributor circuit 90 to the motor 71. Paper advance switch 130 is used for overriding the readout advance circuit 120, and when it is closed the tape will not stop automatically at any of the hole locations. When the paper advance switch is used, it must be released or opened before the machine is able to resume automatic control of the positioning of the tape.

As will be understood by those skilled in the art, what has been described are preferred embodiments in which modifications and changes may be made without departing from the spirit and scope of the accompanying claims.

We claim:

1. Apparatus for aligning and driving a punched tape having a spaced parallel pair of drive hole channels therein, comprising:

a. a payout reel and a take-up reel;
b. first and second idler rollers positioned between said payout reel and said takeup reel so that the tape passes over said first and second idler rollers in succession;

c. drive means including a friction drive roll engaging the tape intermediate to said idler rollers, a spring-loaded roller engaging the tape on the side opposite to said friction drive roll, and means for rotationally driving said friction drive roll;

d. each of said idler rollers having outwardly flanged ends with the length of the roller between said flanged ends being only a small amount greater than the tape width, so that a course alignment of the lateral position of the tape is achieved; and e. each of said idler rollers also having a pair of circumferential rings of sprocket teeth rigidly affixed thereto at the locations of the drive hole channels, for engaging the drive holes of the tape to thereby provide a precise lateral position alignment but without imparting any forward drive to the tape.

2. Apparatus as claimed in claim 1 which further comprises means, including a friction clutch, for driving said take-up reel so as to maintain a predetermined level of longitudinal tension in the tape.

3. Apparatus as claim in claim 1 which includes two such spring loaded rollers, one being aligned with a corresponding ring of sprocket teeth on each of said idler rollers, whereby the tape is grasped between said friction drive roll and one of said spring loaded rollers at the location of each one of the drive hole channels.

4. Apparatus as in claim 3 wherein a flat plate is spaced some distance above the tape at the location of said spring loaded rollers, and extends back toward the idler roller adjacent said payout reel, thus forming a backup guide for the tape when driven in the reverse direction.

* * * * *